July 30, 1968 — J. R. CATERINA — 3,394,517
SELF-LEVELING SELF-ALINING BRICK AND BLOCK
Filed March 31, 1966 — 2 Sheets-Sheet 1
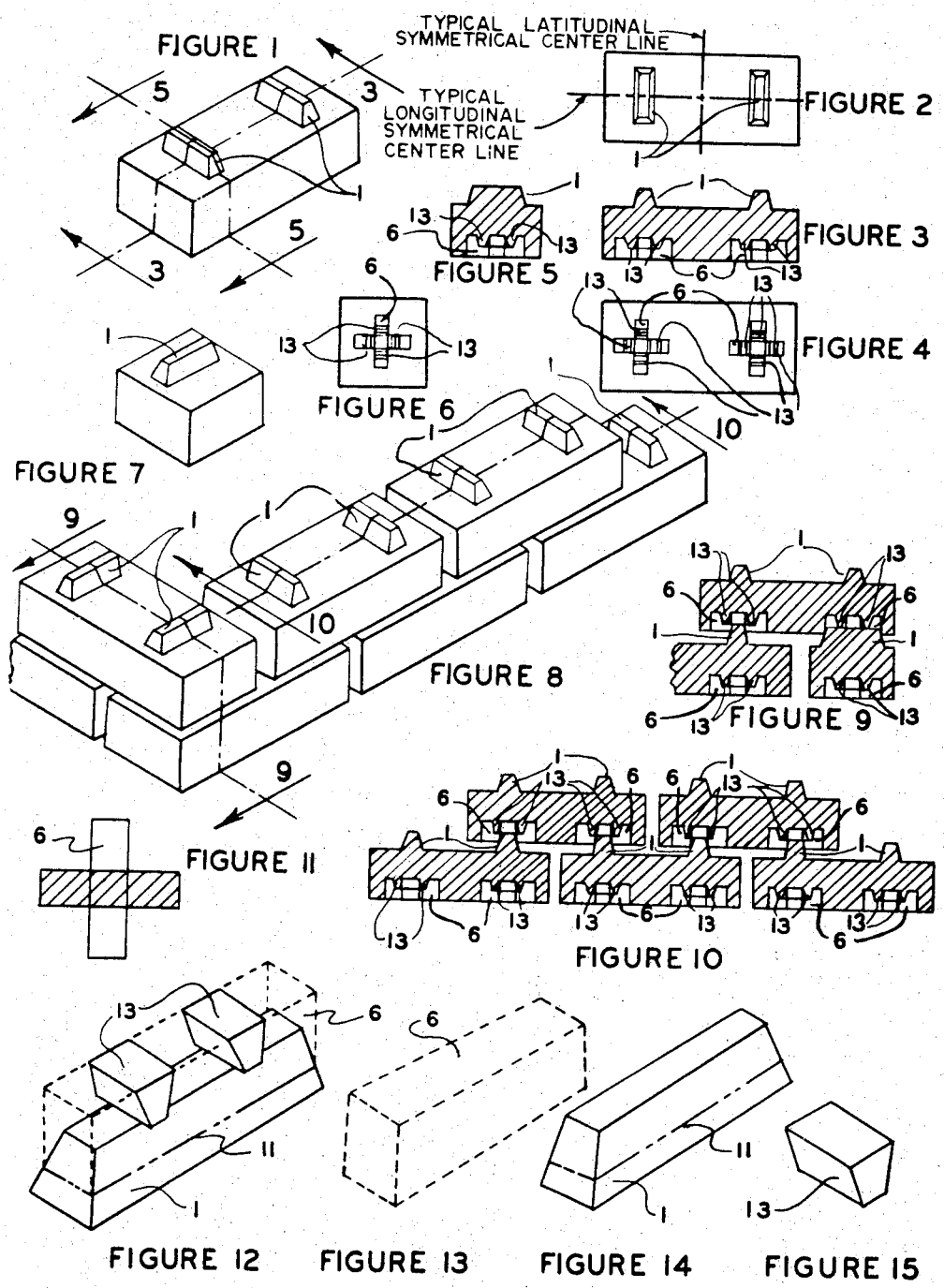
INVENTOR
Joseph Ralph Caterina July 30, 1968  J. R. CATERINA  3,394,517
SELF-LEVELING SELF-ALINING BRICK AND BLOCK
Filed March 31, 1966  2 Sheets-Sheet 2

INVENTOR
Joseph Ralph Caterina

United States Patent Office 3,394,517
Patented July 30, 1968

3,394,517
SELF-LEVELING SELF-ALINING
BRICK AND BLOCK
Joseph Ralph Caterina, 419 Simpson St.,
Peckville, Pa. 18452
Filed Mar. 31, 1966, Ser. No. 538,994
6 Claims. (Cl. 52—436)

ABSTRACT OF THE DISCLOSURE

A building module of rectangular parallelepiped form with coinciding projections and recessions on the top and bottom faces thereof. The projections taper in width from the top faces of the module to the outer terminals of the projections while the recessions may be of uniform or tapering width throughout their depth. Additional projections, called stoppers, of lesser height than the depth of the recessions are disposed within each recession. The projections on the top face are disposed in the recessions on the bottom face of an adjacent module with the tapering projections being jammed in the recession. The stoppers limit insertion to provide a uniform mortar joint between modules.

---

This invention generally relates to a building element and more particularly to a building module such as a brick or a block adapted to be connected together by means of projections extending from one face of the element and arranged so as to engage into the recessions of the other face of the adjacent element when two such elements are assembled. The nature of this invention is a building module that interlocks. Said module can be made of any element or substance that is adaptable to the making of a building module. The primary objectives of this invention are to save time in the assembly of said building elements and to require a less skilled individual to assemble said building elements.

Building elements of this kind will be referred to generally as self-leveling self-alining building modules. The principal object of the invention is to provide a building module that will couple or jam in such a manner as to accomplish the following:

(1) Level itself parallel with the preceding course of building modules in a horizontal position.

(2) Aline itself parallel with the preceding course of building modules in a vertical position.

(3) Space itself in such a manner as to allow for the mortar joints both vertically and horizontally and also to allow for the alternate location of the vertical joints from the preceding course of building modules.

(4) Position itself in any desired horizontal position depending upon the model used and placing the main emphasis on the standard ninety (90°) degree corner position.

The primary purpose for such coupling or jamming is as follows:

(1) To save time in the construction of building moduled structures.

(2) To require less skill to construct building moduled structures.

Fundamentally, the self-leveling self-alining building module according to the invention comprises generally two projections at the top face of the element and two recessions at the bottom face of the element. Both the projections and the recessions are equally offset from the latitudinal symmetrical center line of the related faces of the building module; and the geometric center of each of the projections and recessions being located equally distant from the three nearest edges of the appropriately related faces of the building module. The projections at one face are arranged in such a manner relative to the recessions at the other face that the distance between a pair of projections or recessions is equal.

Other embodiments of the invention, including building modules in the shape of a rectangular parallelepiped of a solid construction, will be described with reference to the accompanying drawings in which:

FIGURE 1 is a plan view of a self-leveling self-alining building module of the basic TYPE A comprising of a base building module and two top face projections.

FIGURE 2 is a plan view of the top face of a preferred embodiment of the invention in the form of a building module in the shape of a rectangular parallelepiped of solid construction.

FIGURE 3 shows a section of the building module shown in FIGURE 1, along line 3—3 in the direction of the arrows.

FIGURE 4 is a plan view showing the bottom face of a preferred embodiment of the invention in the form of a rectangular parallelepiped of solid construction.

FIGURE 5 shows a section of the building module shown in FIGURE 1 along line 5—5 in the drawing in the direction of the arrows.

FIGURE 6 is a plan view showing the bottom face of a preferred embodiment of the invention in the form of a square rectangular parallelepiped of solid construction.

FIGURE 7 is a view of a self-leveling self-alining building module of the basic type comprising of a square faced building module and one top face projection.

FIGURE 8 illustrates the assembly of six and one-half building modules displaced relative to one another in the lengthwise direction and the standard ninety (90°) degree corner position.

FIGURE 9 shows a section of the coupled building module taken on the line 9—9 of FIGURE 8 looking in the direction of the arrows.

FIGURE 10 shows a section of the coupled building modules taken on the line 10—10 of FIGURE 8 looking in the direction of the arrows.

FIGURE 11 represents the recessed portion of the bottom face in plan view of the basic type building module.

FIGURE 12 represents the hatched portion of FIGURE 11 in an assembly isometric illustration showing the typical coupling or jamming of the basic type building module in detail.

FIGURE 13 shows the portion of the recession illustrated in FIGURE 12 and the hatched portion of FIGURE 11.

FIGURE 14 shows a projection of the basic type building module illustrated in FIGURE 12 and the hatched portion of FIGURE 11.

FIGURE 15 shows a recessed projection of the basic type building module illustrated in FIGURE 12 and the hatched portion of FIGURE 11.

The primary projections extending from the top face of the base building module are hereinafter referred to as jammers 1, 2, 3, 4 and 5; the recessed portions of the bottom face of the base building module are hereinafter referred to as recessions 6, 7, 8, 9 and 10.

The recessed projections located in the recession of the bottom face of the base building module are hereinafter referred to as stoppers 13, 14, 15, 16, 17, 18, 19 and 20. The final point of contact where the recession meets the jammer is hereinafter referred to as the jam lines 11 and 12.

Figure 16:
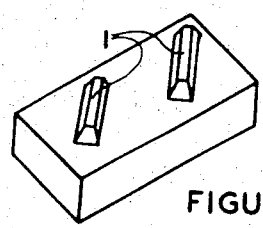
FIGURE 16 is a view of a self-leveling self-alining building module of the alternate TYPE B comprising of a base module and two top faced projections which are skewed at a forty-five (45°) degree angle.
Figure 17:
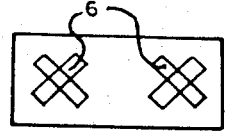
FIGURE 17 is a plan view showing the bottom face of the alternate embodiment TYPE B of the invention in the form of a rectangular parallelepiped of solid construction.

In the embodiments in FIGURES 1, 2, 3, 4, 5, 6, 7, 8 and 9 the jammer 1 is of the type illustrated in FIGURE 14. These jammers are placed parallel to the sides of the base building module except in FIGURE 16 in which the jammers are placed at a forty-five (45°) degree angle to the sides of the base brick. This particular jammer is used in TYPE A (FIGURES 1, 2, 3, 4, 5, 6, 7, 8, 9, 10, 12, 13 and 14); and also in TYPE B (FIGURES 16 and 17).

All jammers are offset equally from the latitudinal symmetrical center line of the top face of the building module and the geometric center of each jammer being located equally distant from the three nearest edges of the top face of the building modules. In the cases of FIGURES 6 and 7 the jammers will be developed about the center of the top face of said figures. The recessions on the bottom face are located to coincide with the jammers on the top face of the building module.

In the preferred TYPE A building module and also TYPE B building module the recession 6 on the bottom face is of a geometric shape as shown in FIGURE 11.

In order to further illustrate the coupling or jamming action in the TYPE A and TYPE B building module reference is made to FIGURES 1 to 10 and FIGURES 16 and 17; reference is also made to FIGURE 12 which is an assembly isometric illustration of the typical coupling action. FIGURE 13 is that portion of the recession 6 shown in FIGURE 11. Incorporated inside of the recession are stoppers 13. A further illustration of a typical stopper is FIGURE 15. Thus the jammer 1 (FIGURE 14) top face preferred building module is placed into the recession 6 until the top surface of the jammer 1 hits the bottom surface of the stopper 13 which is located inside of the recession 6 at which time the coupling or jamming action stops. This action has performed tow primary functions. The first function being the establishment of the parallel distance from the preceding course of building modules. The second function being the establishment of space allowance for the mortar joints both vertically and horizontally. Simultaneously as the coupling action stops the recession 6 stops on the jammer 1 at the jam line 11. Thus the taper on the jammer has caused the building module to jam precisely on the jam line 11. This has established the parallel vertical distance from the preceding course of building modules. Jam line 11 is further illustrated in FIGURE 14. It is this particular coupling or jamming action that is the essential feature of the invention. It should be noted that the only difference in the coupling or jamming action for the different types of the invention (TYPE C, TYPE D, TYPE E, TYPE F, and TYPE G) is the geometric shapes of the jammer, the recession, the stopper, and the jam line.

Figure 18:
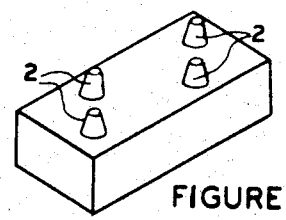
FIGURE 18 is a view of a self-leveling self-alining building module of the alternate TYPE C comprising of a base building element and four top face projections patterned as illustrated.
Figure 19:
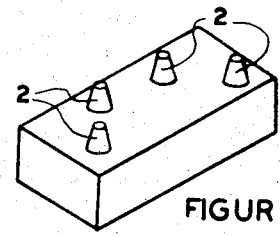
FIGURE 19 is a view of a self-leveling self-alining building module of the alternate TYPE D comprising of a base building module and four top faced projections patterned as illustrated.
Figure 20:
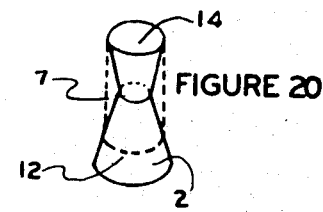
FIGURE 20 shows the recessed portion of the alternate embodiment of the invention TYPE C and TYPE D in an assembly isometric illustration emphasizing the typical coupling or jamming in detail.
Figure 21:
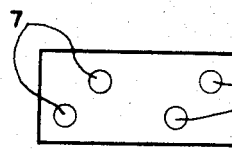
FIGURE 21 is a plan view showing the bottom face of the alternate embodiment TYPE C of the invention in the form of a rectangular parallelepiped of solid construction.
Figure 22:
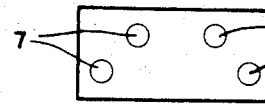
FIGURE 22 is a plan view showing the bottom face of the alternate embodiment TYPE D of the invention in the form of a rectangular parallelepiped of solid construction.

FIGURE 18 and FIGURE 19 TYPE C and TYPE D respectively differ in the geometric shape of the jammer 2, the recession 7, the stopper 14, and the jam line 12 from TYPE A and TYPE B. TYPE C and TYPE D accomplish the same functions as TYPE A and TYPE B building modules. FIGURE 21 and FIGURE 22 show the bottom face of the base building module illustrating the recession 7. The location of recession 7 corresponds and can be vertically projected to the location of jammers 2.

Figures 23, 24, 25:
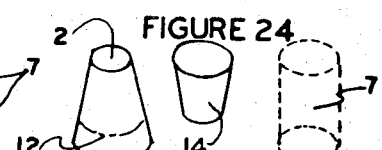
FIGURE 23 shows a projection of the alternate TYPE C and TYPE D illustrated in FIGURE 20.
FIGURE 24 shows a recessed projection of the alternate TYPE C and TYPE D illustrated in FIGURE 20.
FIGURE 25 shows the recessed portion illustrated in FIGURE 20 of the alternate TYPE C and TYPE D.

FIGURE 23 is an illustration of stopper 2 and the jam line 12 for TYPE C and TYPE D building module. FIGURE 24 shows stopper 14 and FIGURE 25 shows the recession 7 for TYPE C and TYPE D building module.

Figure 26:
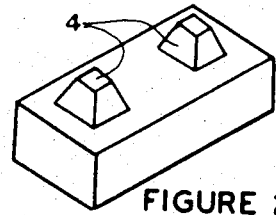
FIGURE 26 is a view of the self-leveling self-alining building module of the alternate TYPE E comprising of a base building module and two top faced projections.
Figure 29:
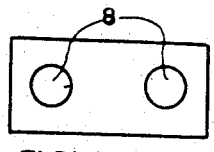
FIGURE 29 is a plan view showing the bottom face of the alternate embodiment TYPE E of the invention in the form of a rectangular parallelepiped of solid construction.

FIGURE 26 illustrates TYPE E building module with jammer 3 and FIGURE 29 shows the bottom face of the base building module with recession 8. Thus the coupling action will be accomplished by placing jammer 3 into recession 8.

Figure 27:
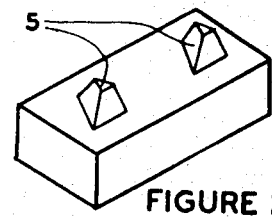
FIGURE 27 is a view of the self-leveling self-alining building module of the alternate TYPE F comprising of a base building module and two top faced projections.
Figure 30:
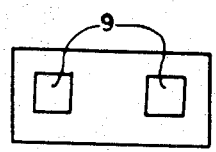
FIGURE 30 is a plan view showing the bottom face of the alternate embodiment TYPE F of the invention in the form of a rectangular parallelepiped of solid construction.

FIGURE 27 illustrates TYPE F building module with jammer 3. FIGURE 30 shows the bottom face of the base building module with recession 9. Thus the coupling action will be accomplished by placing jammer 4 into recession 9.

Figure 28:
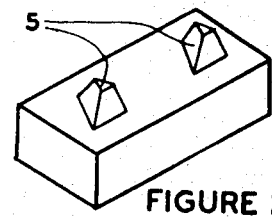
FIGURE 28 is a view of the self-leveling self-alining building module of the alternate TYPE G comprising of a base building module and two top faced projections.
Figure 31:
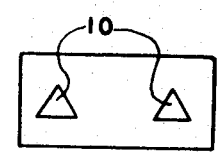
FIGURE 31 is a plan view showing the bottom face of the alternate embodiment TYPE G of the invention in the form of a rectangular parallelepiped of solid construction.
Figure 32:
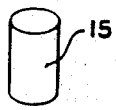
FIGURE 32 shows a cylindrical type recessed projection.
Figure 33:
FIGURE 33 shows a frustum of a cone type recessed projection.
Figure 34:
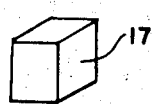
FIGURE 34 shows a right prismoidal type recessed projection.
Figure 35:
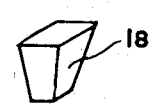
FIGURE 35 shows a frustum of a pyramid type recessed projection.
Figure 36:
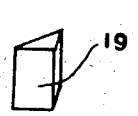
FIGURE 36 shows a triangular based prism type recessed projection.
Figure 37:
FIGURE 37 shows a triangular based frustum of a pyramid type recessed projection.

FIGURE 28 illustrates TYPE F building module with jammer 5. FIGURE 31 shows the bottom face of the base building module with recession 10. Thus the coupling action will be accomplished by placing jammer 5 into recession 10.

FIGURES 32, 33, 34, 35, 36 and 37 are stoppers 15 to 20 respectively. These illustrate the various types and shapes of stoppers that may be used in any or all types of building modules; TYPE A, TYPE B, TYPE C, TYPE D, TYPE E, TYPE F and TYPE G.

It should be pointed out that one of the main advantages of the TYPE E building module shown in FIGURE 26 is that this particular building module may be positioned in any desired position from zero to one-hundred eighty degrees along the horizontal plan; accomplished by being pivoted around the circular shaped jammer 3 and the recession 8.

It should be noted that in every type of building module (Type A thru Type G incl.); that inside of each recession are stoppers. These stoppers are projected outwardly toward the bottom face of the building module recessions. In every type of building module there are stoppers located in the recessions that correspond accordingly to that particular type of module. These stoppers are contained inside of the respective recessions of the related type of building module. The stoppers function is of primary importance and is a critical part of the invention. Under no circumstances can the building modules interlock properly allowing for the compression of the mortar between courses without the utilization of the stoppers.

I claim:

1. In a self-leveling self-alining building module of a rectangular parallelepiped shape comprising four sides, a top face, a bottom face, at least two primary projections extending normally outwardly from said top face, said projections being offset equally from the latitudinal symmetrical center line of the top face of the building module, and the geometric center of each projection being located equally distant from the three nearest edges of the top face along the longitudinal symmetrical center line of the top face of the building module; and at least two primary recessions receding normally inwardly from the bottom face of said building module, said recessions being offset equally from the latitudinal symmetrical center line of the bottom face of the building module, and the geometric center of each recession being located equally distant from the three nearest edges of the bottom face along the longitudinal symmetrical center line of the bottom face of the building module; and at least two stoppers located recessed in each of the recessions on the bottom face of the building module, said stoppers projecting normally outwardly toward the bottom face of the building module from the inward face of each recession, the projections of said building module tapering in width from said top face to the terminals thereof; the projections on one side of said building module being adapted to be inserted into the recessions of another building module, whereby the entry of the projections into the recessions terminates when the terminals of the projections contact the stoppers and uniform spaces for mortar are provided between adjacent modules.

2. A self-leveling self-alining building module as set forth in claim 1 wherein four projections and recessions are located alternatingly equal from the latitudinal symmetrical center line of both top and bottom faces and being located equal distances from the longitudinal symmetrical center line of both top and bottom faces of said building module, the projections and stoppers being in the shape of a frustum of a cone and the recessions being in the shape of a cylinder.

3. A self-leveling self-alining building module as set forth in claim 1 wherein the projections and the stoppers are in the shape of a frustum of a cone and the recessions are in the shape of a cylinder.

4. A self-leveling self-alining building module as set forth in claim 1 wherein the projections and the stoppers are in the shape of a frustum of a pyramid and the recessions are in the shape of a square prism.

5. A self-leveling self-alining building module as set forth in claim 1 wherein the projections and the stoppers are in the shape of a frustum of a triangular pyramid and the recessions are in the shape of a triangular based prism, said self-leveling self-alining building module being capable of positioning itself horizontally from the preceding courses of building modules in various angles as to correspond to the angles used on the triangles of the projections and recessions.

6. A self-leveling, self-alining building module as set forth in claim 1 wherein said projections are in the shape of a frustum of a rectangular pyramid and said recessions are in the shape of intersecting rectangular prisms, said stoppers being shaped as a frustum of a wedge.

References Cited

UNITED STATES PATENTS

| | | | |
|---|---|---|---|
| 1,422,146 | 7/1922 | Tackenberg | 52—594 |
| 1,639,063 | 8/1927 | Stevens | 52—284 |
| 2,321,403 | 6/1943 | McCabe | 52—594 |
| 2,668,435 | 2/1954 | Clements | 52—594 |
| 2,703,487 | 3/1955 | Ossoinack | 52—594 |

FOREIGN PATENTS

| | | |
|---|---|---|
| 5,386 | 3/1896 | Great Britain. |
| 22,798 | 10/1897 | Great Britain. |
| 695,023 | 8/1953 | Great Britain. |
| 870,225 | 3/1942 | France. |
| 278,209 | 6/1952 | Switzerland. |

HENRY C. SUTHERLAND, *Primary Examiner.*